United States Patent [19]

Emblidge

[11] 4,224,739
[45] Sep. 30, 1980

[54] PRUNING TOOL WITH FLEXIBLE HEADPOLE CONNECTION

[76] Inventor: Frank Emblidge, 422 Queens Row St., Herndon, Va. 22070

[21] Appl. No.: 932,295

[22] Filed: Aug. 8, 1978

[51] Int. Cl.³ .................................. B26B 13/26
[52] U.S. Cl. ................................ 30/249; 56/335
[58] Field of Search ............... 30/249, 250, 251, 248, 30/246, 188; 56/332, 333, 335; 128/318

[56] References Cited

U.S. PATENT DOCUMENTS

| | | | |
|---|---|---|---|
| 1,801,675 | 4/1931 | Maguire | 30/249 X |
| 2,932,892 | 4/1960 | Offner | 30/188 X |
| 3,360,858 | 1/1968 | Cowley | 30/249 |
| 3,594,903 | 7/1971 | Schluchter | 30/249 |
| 3,835,535 | 9/1974 | Robison | 30/249 |
| 3,840,003 | 10/1974 | Komiya | 128/318 X |

FOREIGN PATENT DOCUMENTS 1342882  10/1963  France ...................... 30/249

*Primary Examiner*—Jimmy C. Peters
*Attorney, Agent, or Firm*—Cushman, Darby & Cushman

[57] ABSTRACT

A pruning tool is provided that allows the individual operating the tool to make flush cuts of vegetative growth to stems and branches having a wide range of directions of the extension with respect to the point at which the individual is standing, without moving from that point. The pruning tool includes a cutting head, a pole, and operating mechanism including a cord extending down the pole from the cutting head, and a connection between the cutting head and the pole that allows relative angular movement between the cutting head and the pole. The connection may be a coil spring. The operating mechanism includes a 3-pulley system, one of the pulleys being mounted within the pole. A readily moveable sleeve mounted on the pole allows the flexible connection between the pole and the cutting head to be rendered inoperative if desired.

14 Claims, 7 Drawing Figures

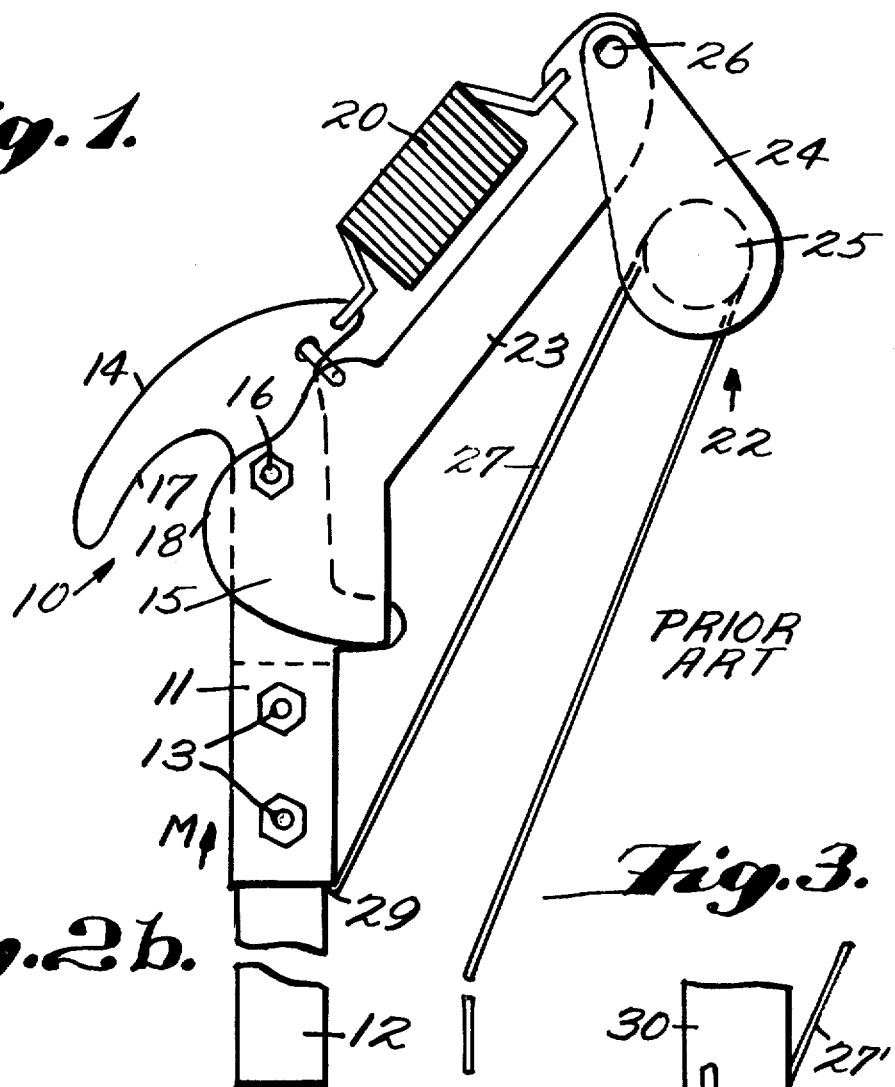
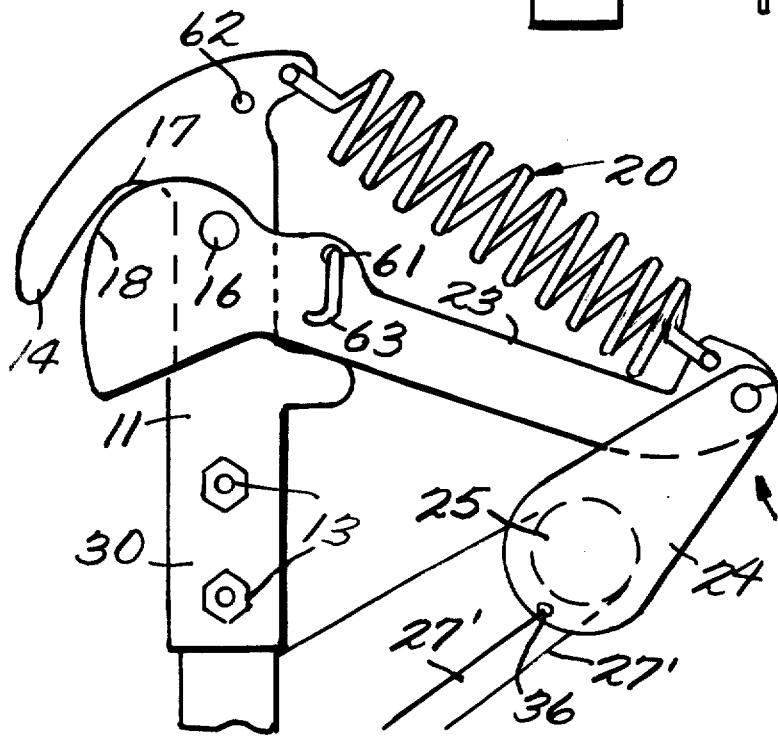
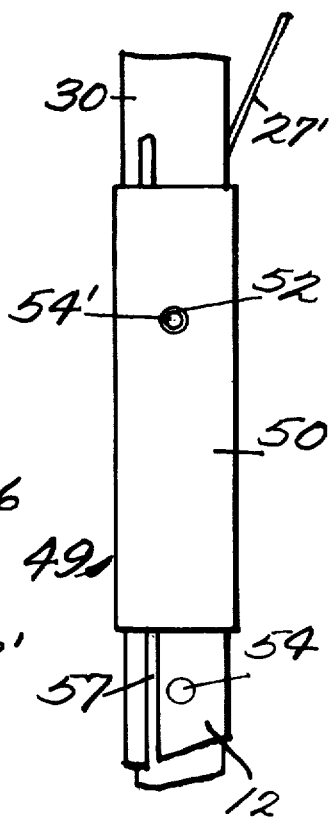

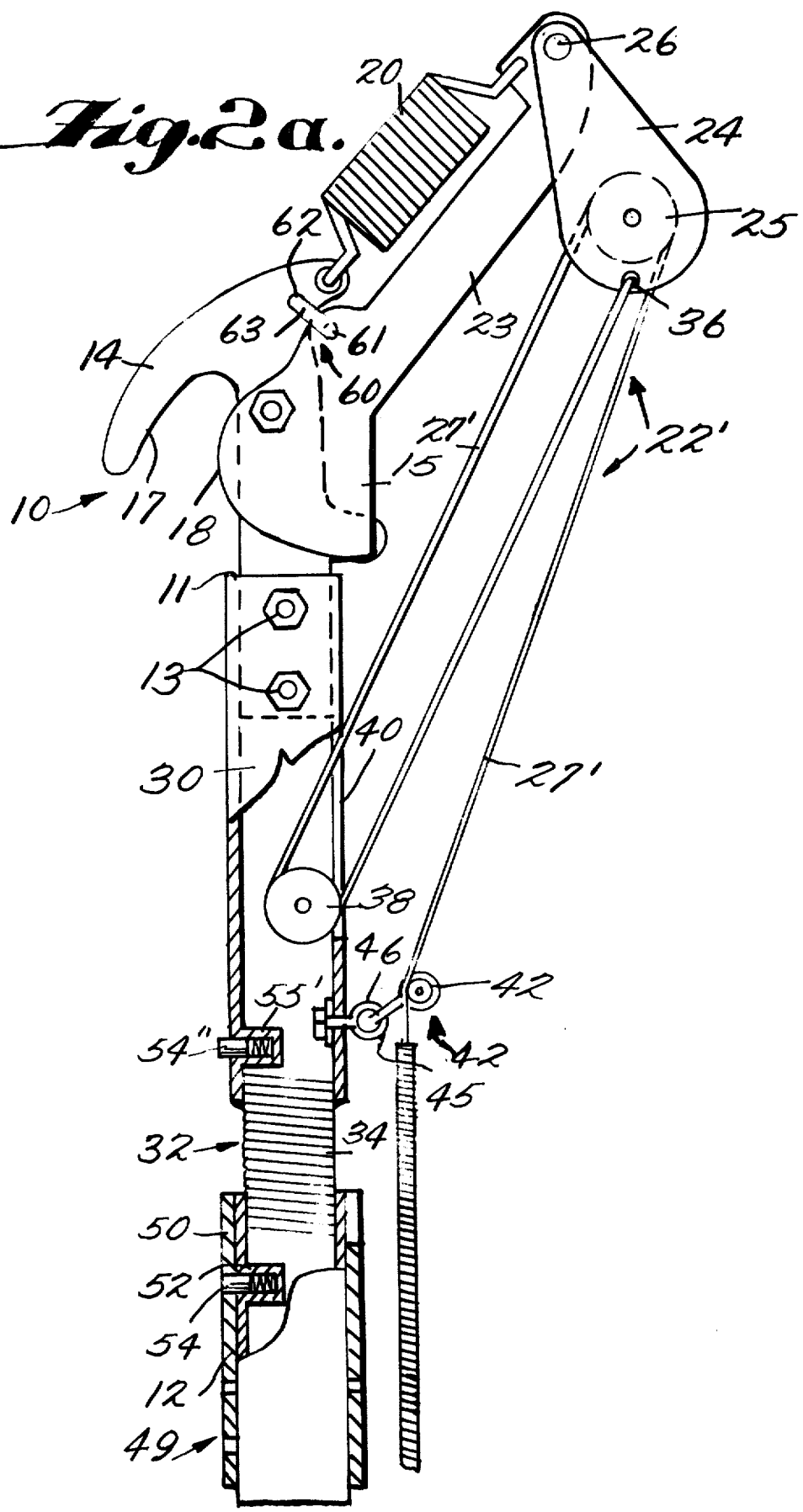

PRUNING TOOL WITH FLEXIBLE HEADPOLE CONNECTION

BACKGROUND AND SUMMARY OF THE INVENTION

Cutting heads especially adapted for pruning, mounted on poles, have been in use at least since the early 1900's. Pole mounted cutting heads in pruning tools are extremely useful in the pruning of large trees and bushes since they minimize the use of ladders and other elevating equipment and in general allow the greatest number of desired twigs or branches to be cut by an operator from any given position.

The cuts made by an operator using conventional pruning tools, however, are not of the highest quality if the operator cuts all twigs and branches which are to be cut within reach of his tool from the same location. Because of the configuration of the cutting tool and pole, some twigs within reach of the tool are at angles with respect to the limbs with which they are associated and with respect to the operator, such that the twigs are cut so that a stub of significant size is left or the twig is "chewed off" by mere manipulation of the pruning tool hooking component, rather than the shearing, cutting action normally provided. Such cuts are highly undesirable since stubs can either cause deadening of portions of the limb with which they are associated, with subsequent weakening of that limb, or a plurality of suckers will sprout from the stub, making the pruning job that much more difficult and time consuming in the future. Also, such stubs and "chewed off" portions are open wounds that, if not patched, will not callus over, and allow entry of disease carrying organisms (such as Dutch elm disease) into the tree's vascular system. All these problems can be avoided by making flush cuts (leaving a stub of about ¼ inch or less), since flush cuts will callus over, will not sprout suckers, and do not cause deadening of portions of the limbs with which they are associated. In order for an operator to make all flush cuts when pruning, however, utilizing conventional pruning tools, it is possible to only cut a small percentage (e.g., 33 percent) of the twigs and branches within reach of the cutting tool when the operator is standing in a given position, requiring the operator to move around to many different locations to cut twigs and branches that can be reached by the pruning tool at one location.

According to the present invention, a pruning tool is provided that allows an operator to make flush cuts of the great majority of vegetation and branches that are desired to be cut within reach of the cutting tool at a point at which the operator is standing, greatly minimizing the amount of movement the operator must make in pruning and/or insuring that all cuts are flush cuts, thereby improving the quality of the pruning job. It is estimated that for a pruning job of the same quality, an operator using the pruning tool according to the invention can complete many speciality jobs in about one third the time that it would take using conventional pruning tools.

The pruning tool according to the present invention comprises a conventional cutting head, a conventional pole, and flexible means for mounting the cutting head with respect to the pole so that the elongated base portion of the cutting head can make an angle greater than 0° with respect to the pole direction of elongation; in fact, preferably the cutting means may assume an operative cutting position at substantially any angle between about 0° and 90°, both with respect to the direction of elongation of the pole and a line perpendicular to the direction of elongation of the pole. The flexible mounting means may comprise a coil spring and a sleeve may be slidable over the pole to cover the spring, and operatively attach to the pole and cutting head to render the flexing action of the spring inoperative.

Also, according to the present invention, an operating mechanism for the cutter is provided that allows the operation of the cutting blades to effect cutting more effortless and, additionally, insures that operation of the cutting head can be effected despite the angular orientation of the cutting head with respect to the pole. The operating means includes a lever extension of the movable cutting blade, a first pulley, means for mounting the first pulley with respect to the lever extension of the second component, a second pulley, and a cord affixed to the first pulley mounting means extending from the first pulley mounting means around the second pulley, around the first pulley, and ultimately then generally parallel to the direction of elongation of the pole. The operating means further comprises a third pulley for receipt of the cord as it extends generally parallel to the pole direction of elongation, and means for swivelly mounting the third pully on the cutting head base portion. Additionally, it is desirable to provide a locking mechanism for the cutting blade for when the tool is not in use.

It is the primary object of the present invention to provide a pruning tool that allows the individual utilizing the tool to make flush cuts of vegetative growth to stems and branches having a wide range of directions of extension with respect to the point at which the individual is standing, without the individual moving from that point, and with a minimum of effort to effect cutting. This and other objects of the invention will become clear from an inspection of the detailed description of the invention, and from the appended claims.

BRIEF DESCRIPTION OF THE DRAWINGS

FIG. 1 is a side view of a conventional prior art pruning tool;

FIG. 2a is a side view, partly in section and partly in elevation, of an exemplary pruning tool according to the invention, and FIG. 2b is a side view of the tool of FIG. 2a, showing the cutting blades in a cutting position;

FIG. 3 is a detailed front view of exemplary means rendering the spring connection of FIG. 2a inoperative;

DETAILED DESCRIPTION OF THE DRAWINGS

Figure 4:
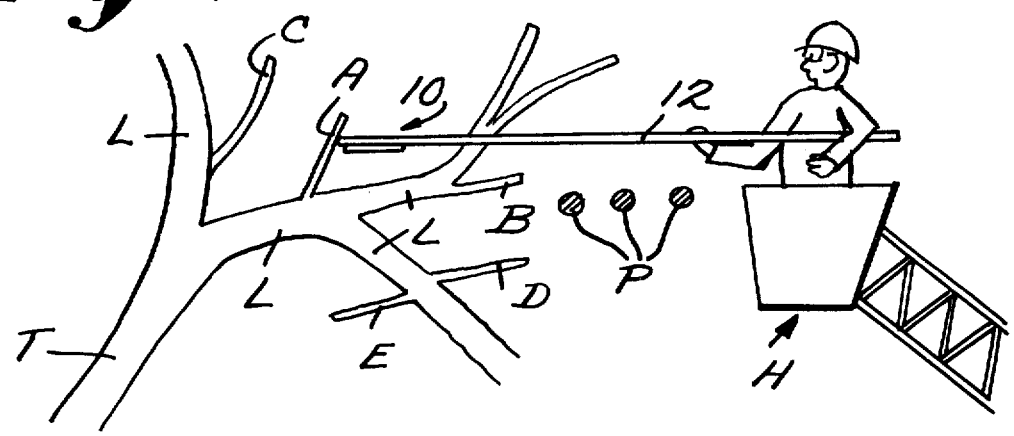
FIG. 4 is a schematic view illustrating how a pruning tool according to the invention might be used.

A pruning tool that is conventionally used at present is shown in FIG. 1. The tool in FIG. 1 has a cutting head 10 known in the trade as a "Porter pruner head," which cutting head 10 includes an extension 11 which is connected to an elongated pole, such as a wooden pole 12, a connection between the pole 12 and extension 11 being made by bolts 13 or the like. The cutting head 10 includes a first cutting component 14, a second component 15 pivotally mounted at pivot 16 to the component 14, with sharpened portions 17 and 18 of the components 14, 15, respectively, cooperating to effect cutting. A spring 20 biases the second component 15 to a non-cutting position with respect to the first component 14, as illustrated in FIG. 1, and by operation of the operating means 22, movement of the component 15 about pivot 16 is effected against the bias of spring 20 to effect cutting.

The operating means 22 of the prior art pruning tool shown in FIG. 1 includes a lever extension 23 of the the second component 15, a first pulley 25, means 24 for mounting the first pulley with respect to the lever extension 23 about pivot 26, and a cord 27 affixed at point 29 to the pole 12 (or extension 11), wrapped about the pulley 25 and then extending generally parallel to the direction of elongation of the pole 12.

An exemplary pruning tool according to the present invention is best illustrated in FIGS. 2a and 2b, FIG. 2a showing the non-cutting position thereof, and FIG. 2b a cutting position thereof. The components of the cutting head 10 may be substantially identical to those of the prior art cutting head 10 of FIG. 1; however, according to the present invention, an element 30 is provided, which element 30 may be considered to be part of the pole 12, or a part of the cutting head base portion 11, and in any event extends from the element 11 away from the cutting head 10. Means 32 are provided for mounting the cutting means 10 with respect to the pole 12 so that the cutting means 10 may assume an operative cutting position at substantially any angle between about 0° and 90°, both with respect to the direction of elongation M of the pole 12, and a line perpendicular to the direction of elongation M of the pole 12. The mounting means 32 thus allows an individual operating the tool to make flush cuts of vegetative growth to stems and branches having a wide range of directions of extension with respect to the point at which the individual is standing, without the individual moving from that point. In fact, an individual can make flush cuts of a great majority of twigs and branches within reach of the pruning tool. The means 32 may comprise a coil spring 34 mounted to the components 12, 30, although other structures for performing the same function also may be utilized.

The operating means 22' according to the present invention is adapted to effect operation of the cutting means 10, no matter what angle cutting means 10 assumes with respect to the pole 12, and additionally effects the cutting operation with the application of less force by the operator. The operating means 22' includes the components 23, 24, 25 and 26 as in the Porter pruner head, and additionally comprises a second pulley 38 mounted within structure 30, which is hollow, at least at the area where the axis of rotation of the second pulley 38 is mounted. The cord 27' is operatively connected at 36 to the first pulley mounting means 24, the cord 27' extending from point 36, around second pulley 38, extending through slit 40 in component 30 when entering and leaving component 30, extending over first pulley 25, and then downwardly and generally parallel to the pole 12. A third pulley 42 also is preferably provided, and means 43 for swivelly mounting the third pulley 42 on the member 30. The means 43 may comprise a pair of ears 44 (only one being shown in FIG. 2a, and the front one being cut away for clarity) mounting the pulley 42 for rotation and having a loop 45 which passes through an eyelet 46 mounted to the member 30.

Under some circumstances, it may be desirable to utilize the pruning tool according to the invention in essentially the same manner as the prior art pruning tool—that is, without any capability of moving the cutting head 10 to angular positions with respect to the pole 12. To accommodate such situations, according to the present invention, means 49 may be provided for rendering the flexible means 32 inactive by locking the cutting head base portion 11 (30) with respect to the pole 12 so that the directions of elongation N, M thereof are coextensive. Such means 49, shown most clearly in FIGS. 2a and 3, may comprise a sleeve 50 surrounding the pole 12 and slidably mounted with respect thereto, and having one or more openings 52 associated therewith. Spring-pressed detents 54, 54' or the like, which may utilize conventional pressing springs 55, 55', are associated with the pole 12 and the component 30, respectively, the detents 54, 54' adapted to fit through the opening(s) 52. Additionally, a guide-key member 57 may be provided on the elements 12, 30, and a cooperating groove formed interiorly of the sleeve 50 to insure proper alignment of the opening(s) 52 with the detents 54, 54'. FIG. 2a shows the tool according to the invention in position wherein the cutting head 10 can assume angular positions with respect to the pole 12, and FIG. 3 shows the tool components 12, 30 locked in a coextensive position, the means 32 having been rendered inoperative.

When the pruning tool according to the present invention is not in use, it is desirable to maintain the cutting components 14, 15 thereof in a position where they cannot be moved together. This is accomplished according to the present invention by the releasable locking means 60 (see FIGS. 2a and 2b), which include a post 61 on component 15 opposite the pivot point 16 of the blade 18 (which post 61 may comprise an extension of the conventional stop associated with prior art cutting heads), a post 62 mounted on first component 14, and a hooked spring member 63 or the like for hooking the posts 61, 62 together, as shown in FIG. 2a, or for allowing relative movement therebetween when unhooked, as shown in FIG. 2b.

Exemplary structures according to the present invention now having been described, advantageous uses to which it can be put, and modes of operation thereof, will now be described.

FIG. 4 shows a pruning tool having a cutting head 10 and a pole 12 in a normal use. An operator in a lift mechanism H is positioned on one side of power lines P, and is pruning a tree T on the other side of the power lines P. It is desired to trim branches A, B, C, D, and E, for instance, off of limbs L. Using a prior art pruning tool, as shown in FIG. 1, the operator can readily flush cut branch A to limb L from the position shown in FIG. 4. However, it will be difficult, if not impossible, to flush cut branches B, C, D, and E from that position, even though all such branches are within the reach of the pruning tool from that position. Thus, the operator will either cut off the branches B through E so that stubs are left which will sprout suckers or cause weakening of the limbs with which they are associated, or the operator will "chew off" the branches by hacking at them with the hook-shaped blade 17 of the pruning tool, with the same adverse results mentioned above, or the operator will have to change his position a number of times in order to flush cut the branches B through E.

Figure 5A:
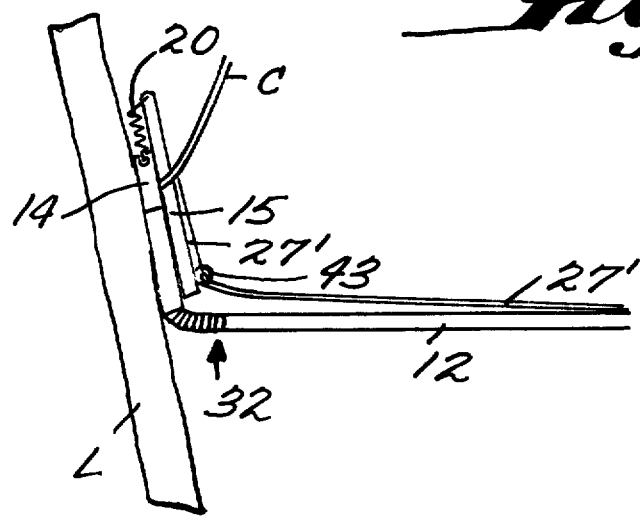
FIG. 5a is a schematic view illustrating the use of a pruning tool according to the invention when the twig to be cut is disposed at a large angle with respect to the position of the pruning tool pole.

Utilizing the pruning tool according to the present invention, however, an operator in the position illustrated in FIG. 4 can flush cut branches A through D without difficulty without changing his position, and most likely can cut branch E also. FIG. 5a shows diagrammatically how the operator flush cuts branch C from the position illustrated in FIG. 4, the operator moving the cutting head 10 into position against the limb L, applying a downward force on the pole 12 while the head 10 abuts the limb L, and effecting movement of the pruning tool until the hook-shaped component 14 is flush against the limb L, surrounding the branch C (as shown in FIG. 5a). The operator then pulls on cord 27', which rides around the third pulley 42, first pulley 25, and second pulley 38 to exert a pulling force at point 36 on member 34, to effect the cutting action (see FIG. 2b). The force applied by cord 27' is properly transmitted to pulley 25 by third pulley 42 since the swivelable connection 43 of the pulley 42 allows it to assume the proper orientation.

Figure 5B:
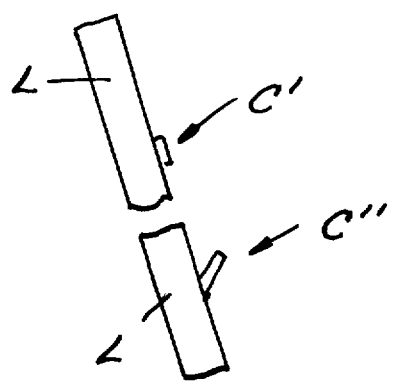
FIG. 5b is a comparison between the cuts made of the twig of FIG. 5a utilizing the invention and utilizing a prior art cutter.

FIG. 5b shows at C' the limb C of FIG. 5a after being cut, utilizing the pruning tool according to the present invention, and shows at C" the cut that would be made by an operator from the position shown in FIG. 4, utilizing the prior art pruning tool. The cut C' will callus over, whereas the cut C" will either sprout suckers, cause a portion of the limb L below the cut C' to deaden, or allow entry of organisms destructive to the tree (i.e., Dutch elm disease).

It will thus be seen that according to the present invention a pruning tool has been provided that allows an individual operating the tool to make flush cuts of vegetative growth to stems and branches having a wide range of directions of extension with respect to the point at which the individual is standing, without the individual moving from that point, and with a minimum of cutting force. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. In a pruning tool comprising means for cutting vegetation, an elongated pole for mounting said vegetation cutting means and means for effecting operation of said cutting means; and
    means for mounting said cutting means with respect to said pole so that said cutting means may assume an operative cutting position at substantially any angle between about 0° and about 90°, both with respect to the direction of elongation of said pole and a line perpendicular to the direction of elongation of said pole;
    said mounting means comprising a flexible element operatively connected to said cutting means and said pole.

2. In a pruning tool comprising a cutting head comprising a first, hook-shaped cutting component and a second cutting component, said second component pivotally mounted with respect to said first component and an elongated base portion affixed to said first component, means for pivoting said second component with respect to said first component for effecting cutting of vegetation, spring means for returning said second component to a non-cutting position with respect to said first component; and a rigid pole;
    flexible means for mounting said cutting head with respect to a rigid pole so that said cutting head base portion direction of elongation is normally coextensive with said pole direction of elongation but is moveable to positions wherein said base portion direction of elongation makes an angle greater than 0° with respect to said pole direction of elongation.

3. In a pruning tool as recited in claim 2, further comprising means for rendering said flexible means inactive by locking said cutting head base portion with respect to said pole so that the directions of elongation thereof are coextensive.

4. In a pruning tool as recited in claim 2, wherein said flexible means comprises a coil spring operatively connected to said cutting head base portion and said pole.

5. In a pruning tool as recited in claim 2, wherein said means for pivoting said second component with respect to said first component comprises a lever extension of said second component extending generally away from said pole, a first pulley, means for mounting said first pulley with respect to said lever extension of said second component, a second pulley, a cord affixed to said first pulley mounting means, said cord extending from said first pulley mounting means around said second pulley, around said first pulley, and ultimately then generally parallel to the direction of elongation of said pole, a third pulley for receipt of said cord as it extends generally parallel to said pole direction of elongation, and means for swivelly mounting said third pulley on said cutting head base portion.

6. In a pruning tool as recited in claim 2, wherein said means for pivoting said second component with respect to said first component comprises a lever extension of said second component extending generally away from said pole, a first pulley, means for mounting said first pulley with respect to said lever extension of said second component, a third pulley, means for swivelly mounting said third pulley on said cutting head base portion, and a cord extending around said first pulley and being received in said third pulley as it extends generally parallel to said pole.

7. In a prunning tool comprising a cutting head comprising a first hook-shaped cutting component and a second cutting component, said second component pivotally mounted with respect to said first component, a pole operatively connected to said cutting head, an elongated base portion elongated in the same direction of elongation as said pole, spring means for biasing said second component to a first, non-cutting position with respect to said first component, and operating means for pivoting said second component with respect to said first component to a second, cutting position against the bias of said spring means;
    said operating means comprising a lever extension of said second component extending generally away from said pole; a first pulley; means for mounting said first pulley with respect to said lever extension of said second component; a second pulley; a cord affixed to said first pulley mounting means, said cord extending from said first pulley mounting means around said second pulley, around said first pulley, and ultimately then generally parallel to the direction of elongation of said pole; a third pulley for receipt of said cord as it extends generally parallel to said pole direction of elongation, said third pulley having an axis of rotation; and means for swivelly mounting said third pulley operatively with said cutting head base portion for pivotal movement of said axis of rotation with respect to said base portion.

8. In a pruning tool as recited in claim 7, further comprising locking means operatively directly connected to said first component and said second component for preventing relative movement therebetween.

9. In a pruning tool as recited in claim 7, further comprising means mounted on said pole for receipt of said cord portion extending generally parallel to said pole for maintaining said cord portion adjacent said pole.

10. In a pruning tool as recited in claim 7, wherein at least the axis of rotation of said second pulley is operatively mounted within a portion of said pole, at least said portion of said pole being hollow.

11. In a pruning tool comprising means for cutting vegetation, an elongated pole for mounting said vegetation cutting means and means for effecting operation of said cutting means; and means for mounting said cutting means with respect to said pole so that said cutting means may assume an operative cutting position at substantially any angle between about 0° and about 90°, both with respect to the direction of elongation of said pole and a line perpendicular to the direction of elongation of said pole;

said means for mounting said cutting means comprising means for biasing said cutting head to an in-line position with respect to said elongated pole, and for automatically returning said cutting head to said in-line position after termination of a force moving it from said in-line position.

12. In a pruning tool as recited in claim 11, said mounting means comprising a flexible element operatively connected to said cutting means and said pole.

13. In a pruning tool as recited in claims 1 or 12 wherein said pole is hollow, and wherein said flexible element includes a coil spring at least partially received within said hollow pole.

14. In a pruning tool as recited in claims 1 or 12, further comprising a sleeve of rigid material mounted on said pole for movement with respect to said pole and moveable from a first position wherein said flexible element is operable to allow relative angular movement between said pole and said cutting means, to a second position wherein said flexible element is rendered inoperable, and said angularly cutting means is angularly locked with respect to said pole.

* * * * *